Figure 1:
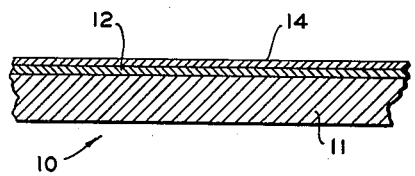

May 24, 1960  E. J. MARAK  2,938,125
WEAR DETERMINATION METHOD
Filed June 6, 1955

INVENTOR.
E. J. MARAK
BY *Hudson & Young*
ATTORNEYS

United States Patent Office 2,938,125
Patented May 24, 1960

2,938,125

WEAR DETERMINATION METHOD

Eldon J. Marak, Dewey, Okla., assignor to Phillips Petroleum Company, a corporation of Delaware Filed June 6, 1955, Ser. No. 513,474

5 Claims. (Cl. 250—106)

This invention relates to a method and means or device for determining the extent and/or pattern of surface wear of wear-resistant surfaces, such as on bearings, pistons, and cylinders of internal combustion engines, and other moving parts of machines.

The need for a positive method of determining the extent and pattern of wear on surfaces moving over each other is well recognized. This invention is concerned with a positive and simple method and means of determining the wear pattern on a wear-resistant surface subjected to attrition by a contacting surface and the time at which wear to a predetermined depth from the original surface has taken place. The invention is particularly applicable to the extent of wear and pattern of wear occurring in such bearings as connecting rod bearings and crank shaft main bearings of various types of engines as well as to pistons, piston rings, cylinders, gears, shaft bearings, and other friction parts of machines in general. The invention is also applicable to the determination of the extent and pattern of wear of other rotating and sliding surfaces.

An object of the invention is to provide a method for determining the extent and/or pattern of wear of a solid wear-resistant surface subjected to attrition by moving contact with another surface. Another object is to provide a method for determining wear characteristics of a wear-resistant material when subjected to attrition. Another object is to provide an improved method of testing the quality of lubricants. A further object of the invention is to provide wear-testing compositions and articles which facilitate testing procedures and which provide an indication of a specific amount of wear. Another object is to provide bearing and other moving parts of machines which readily indicate the extent and pattern of wear in tests and in service. It is also an object of the invention to provide an arrangement of equipment for accurately ascertaining when parts replacement or servicing of an engine is required. Other objects of the invention will become apparent upon consideration of the accompanying disclosure.

The invention in its broadest aspect comprises impregnating the surface of a base material with a substance which may be readily detected by physical and/or chemical means and coating the impregnated surface with a layer of wear-resistant material free of said substance so that when the wear-resistant layer is subjected to wear over a period of time sufficient to penetrate the wear-resistant layer at any point the detectable substance appears in the wear debris where it is identified and reveals the worn condition of the surface. The invention is particularly applicable to the indication of wear extent and pattern in metal surfaces subjected to friction with other metal surfaces wherein the surface upon which the wear-resistant material is placed is impregnated with a radioactive substance such as the radioactive isotopes of certain metals so that when the overlay of wear-resistant material is penetrated by wear, the radioactive material appears in the wear debris where it is readily and immediately detected by an instrument sensitive to radioactive material, such as a Geiger tube, a scintillation counter, an ionization gauge, etc. The thickness of the wear-resistant layer is predetermined so as to provide any desirable wear period in accordance with the particular use to which the wear-resistant material is subjected.

Figure 3:
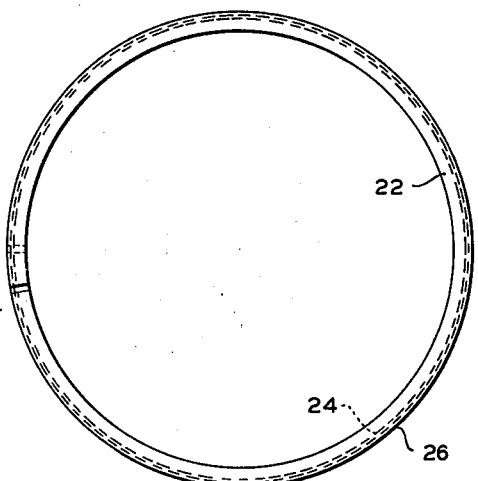
Figure 2:
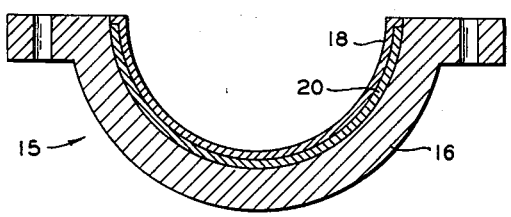
Figure 4:
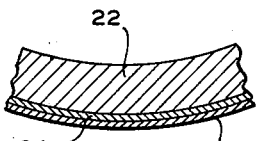
Figure 5:
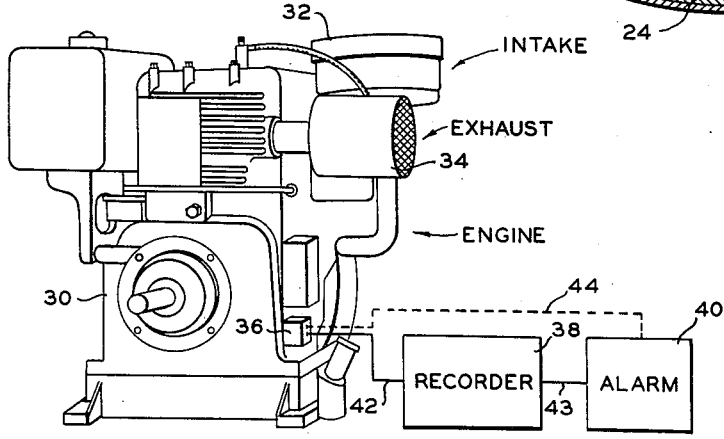

In order to illustrate the invention reference is made to the drawing of which Figure 1 is a fragmentary cross section of a structure provided with a wear-resistant surface; Figure 2 is a cross section of a bearing cap; Figure 3 is a plan view of a piston ring; Figure 4 is a fragmentary cross section of the piston ring of Figure 3; and Figure 5 is a plan view showing an engine and detector alarm system for indicating bearing wear.

Referring to Figure 1, a wear-resistant member 10 comprises a base or supporting structure 11 provided with a layer 12 containing a readily detectable substance which is introduced by any suitable means such as incorporation in a layer of material of which 11 is fabricated or of another suitable material bonded to 11 by any suitable means. The layer of wear-resistant material 14 is suitably bonded directly to the surface of layer 12 so that when the member represented by numeral 10 is subjected to wear or tested for the wear resistance of layer 14, the detectable material in layer 12 appears in the wear debris upon penetration or complete wearing away of any area of layer 14. In this manner the wearing properties of layer 14 and/or the time for replacement of this layer or of device 10 carrying this layer is indicated.

Figure 2 shows a bearing cap 15 comprising a structural element 16 formed of strong ferrous metal, such as is conventional, which rigidly supports a suitable bearing material. A tough wear-resistant layer of bearing material 18 is bonded to layer 20 which may comprise the impregnated inner surface of bearing support 16 or a layer of similar or dissimilar material bonded to support 16. It is essential that layer 20 be impregnated with a readily identifiable substance which does not appear in layer 18 on which wear takes place directly. The preferred identifiable substance for use in bearings and metal parts is a radioisotope of zinc, maganese, cobalt, nickel, or tin. The isotope is introduced to layer 20 by means known in the art such as incorporating the isotope in an alloy which is bonded to base 16 or subjecting the inner arcuate surface of bearing cap 15 to bombardment, for example, in a reactor or cyclotron. It is also feasible to incorporate in the inner arcuate surface of member 16 a naturally occurring radioactive substance such as radium and uranium compounds.

It is feasible to bond layer 20 to base 16 by electroplating. These layers also may be cast in place or cast separately and heat bonded by suitable means. Another method by which layers 18 and 20 may be fabricated and bonded to base 16 comprises the technique known as powdered metallurgy. Layer 18 may be formed of fused tin base white metal, babbitt, silver, copper, or any other alloy commonly used for bearing surfaces. Layer 20 may be formed of bronz, copper, ferrous metal, or other suitable alloy but must be impregnated with at least a trace amount of the radioactive substance which is to function as the identifiable substance of the invention.

The radioisotopes, zinc, manganese, cobalt, nickel, and tin, have half lives in the range of 105 days to 16 years. The isotope selected for the particular use will depend upon the anticipated useful life of layer 18 or upon the character of the test to which the bearing surface is subjected in the event the device is being used in a test program. In test engines where the engine is run continuously until it breaks down, layer 20 may contain radioactive tin, zinc, or manganese having a half life considerably less than one year. In large stationary engines and in lighter engines where the engine runs for relatively long periods of time without requiring overhaul, layer 20 should contain isotopes of cobalt or nickel having half lives of 5 and 15 years, respectively.

Figures 3 and 4 show a piston ring 21 comprising a ferrous metal base 22 which is provided with an outer surface 24 impregnated with a radioactive substance such as described in connection with Figure 2. The wear-resistant layer 26 is bonded directly to surface or layer 24 containing a radioactive substance so that when layer 26 is penetrated by wear the radioactive substance appears in the wear debris for immediate detection. As before the radioactive isotope may be introduced or impregnated in the surface of the base material of the piston ring or it may be incorporated in a layer of material bonded to the ferrous metal of the piston ring by electroplating or other suitable means. Wear-resistant layer 26 is preferably bonded to the supporting material by electroplating but it may be bonded by other suitable means known in the art. The invention is particularly applicable to the chrome plating techniques of the piston ring art wherein the wear-resistant surface of the piston rings comprises chromium. The technique of the invention is particularly advantageous when applied to piston rings for the purpose of effecting scuffing tests wherein considerable metal transfer occurs and where present standard techniques rest on questionable premises. In the various structures represented and discussed in connection with Figures 1–4, it should be borne in mind that the underlying layer of metal containing the radioactive material should not be exposed at any point such as at the edge of the layer but should be completely covered so as to avoid escape of the substance except through the normal course of wear of the wear-resistant surface under which the identifiable substance is deposited.

Figure 5 shows an arrangement of an engine 30, provided with an intake 32 and an exhaust 34, in combination with a detector 36, a recorder 38, and an alarm 40 which functions to provide a warning when bearing wear has proceeded to the extent that replacement of bearing surface and overhaul are necessary. One or more bearings or other friction surfaces in stationary engine 30 is manufactured or fabricated in the manner illustrated in Figures 1-4 so that when wear or attrition has penetrated the wear-resistant surface, radioactive substance appears in the wear debris and in the crankcase oil which is circulated through detector 36. Instrument 36 may comprise a Geiger tube, a scintillation counter, or an ionization gauge. A signal is passed to recorder 38 and/or alarm 40 by communicating lines such as 42 and 43 or by 44. Various recording devices are commercially available, e.g., the Brown recorder, which provide an indication and record of the appearance of radioactive substance in the oil as detected by instrument 36. In the arrangement shown, an alarm 40, which may comprise a speaker, a buzzer, a bell, a light, or other signaling device, is actuated by recorder 38. This device may also be actuated directly by detector 36 through communicating line 44. Instruments 36, 38, and 40 are conventional and commercially available. The system shown continuously monitors the condition of the oil and reports whether or not radioactive materials have been released into the oil due to wearing away of the wear-resistant surface of any of the parts of the engine constructed in accordance with the invention. The recorder and/or alarm may be operated by a timer and turned on periodically as suitable or convenient, e.g., hourly, daily, or weekly, to check the condition of the oil in the engine. It is also feasible to omit the auxiliary equipment shown in Figure 5 and collect and check a sample of the oil periodically by conventional means to ascertain if radioactive substance is present in the oil.

A suitable circuit for operating the alarm of Figure 5 is shown in the U.S. Patent 2,596,500. It is feasible to utilize such a circuit to operate a switch in the ignition system of any internal combustion engine to terminate its operation when a bearing surface is worn through or to operate a valve in the fuel line of a diesel engine to effect a similar result. In this arrangement and method the detector circuit signal operates a switch in a circuit of greater power which in turn operates a solenoid switch or valve to effect the stoppage.

In order to determine the wear pattern of the bearing surface the worn bearing surface may be photographed or recorded by placing an X-ray film over the same whereupon the light and dark areas on the developed film indicate the points at which concentrated wear has occurred. The variation in the intensity of color of the developed impression gives an indication of the comparative wear, assuming that the wear-resistant bearing surface was of uniform thickness at the time of installation.

The invention is applicable to any type of engine such as a jet engine, turbine, diesel, gasoline, steam, etc. It is also applicable to use in dynamos, generators, and all types of heavy equipment which utilize bearing surfaces which are critical to the operation of the equipment.

Certain modifications of the invention will become apparent to those skilled in the art and the illustrative details disclosed are not to be construed as imposing unnecessary limitations on the invention.

I claim:
1. The method of determining extent and pattern of wear on a layer of solid wear-resistant material which comprises impregnating a base material over the entire surface which is to support said wear-resistant material with a radioactive substance; covering the resulting impregnated material with a thin layer of said wear-resistant material, free of said radioactive substance, of predetermined thickness; subjecting said layer to wear sufficient to include a detectable amount of said radioactive substance in the wear debris; detecting said substance as it initially appears in said wear debris; and mapping the worn surface by placing a radioactive sensitive film over said surface and developing same to obtain a wear pattern.

2. The process of claim 1 applied to a metallic bearing surface of a working part of a machine.

3. The process of claim 2 wherein said bearing surface is an oil-lubricated connecting rod bearing and said oil is tested at least at frequent periods for said radioactive substance.

4. The process of claim 1 wherein said layer comprises the wearing surface of a piston ring.

5. The process of claim 1 wherein said base material comprises a metallic member and said radioactive substance is incorporated in a metallic layer deposited on said member.

References Cited in the file of this patent

UNITED STATES PATENTS

| | | |
|---|---|---|
| 2,315,845 | Ferris | Apr. 6, 1943 |
| 2,468,905 | Warren, Jr. | May 3, 1949 |